United States Patent [19]

Hazebrook et al.

[11] Patent Number: 4,846,764
[45] Date of Patent: Jul. 11, 1989

[54] CONSTANT VELOCITY JOINT CAGE AND METHOD FOR MAKING SAME

[75] Inventors: Daniel W. Hazebrook, Detroit, Mich.; Jurgen Wagner, Greensboro, N.C.

[73] Assignee: GKN Automotive Components, Inc., Auburn Hills, Mich.

[21] Appl. No.: 95,840

[22] Filed: Sep. 14, 1987

[51] Int. Cl.⁴ .............................................. F16D 3/23
[52] U.S. Cl. .................................... 464/145; 464/906
[58] Field of Search ................ 384/523, 530; 464/144, 464/145, 146, 906

[56] References Cited

U.S. PATENT DOCUMENTS

| | | | |
|---|---|---|---|
| 2,319,100 | 5/1943 | Anderson | 464/145 X |
| 2,322,570 | 6/1943 | Dodge | 464/145 X |
| 2,911,805 | 11/1959 | Wildhaber . | |
| 3,412,580 | 11/1968 | Cull . | |
| 3,541,809 | 11/1970 | Howey . | |
| 4,034,576 | 7/1977 | Takahashi . | |
| 4,244,196 | 1/1981 | Staeheli et al. . | |
| 4,377,385 | 3/1983 | Sindelar . | |
| 4,511,346 | 4/1985 | Hazebrook et al. . | |
| 4,533,339 | 8/1985 | Girguis . | |
| 4,536,038 | 8/1985 | Krude . | |
| 4,575,362 | 3/1986 | Girguis . | |
| 4,589,857 | 5/1986 | Okoshi . | |

FOREIGN PATENT DOCUMENTS 978230 12/1964 United Kingdom ............... 464/145

Primary Examiner—Daniel P. Stodola
Attorney, Agent, or Firm—Remy J. VanOphem

[57] ABSTRACT

A method for making constant velocity joint cages involving a minimalization of offal, scrap, rework, production time and production costs. A sheet of flat metal stock is die-cut stamped or cut by laser into a circularly shaped multi-limbed member having a central circular aperture therein and truncated limb radials extending therefrom that end in a predetermined angle. The multi-limbed member is then pressed into a spherical shape, forming a half-cage member. This process is repeated to make a second half-cage member. The two half-cage members are then placed together with their radials aligned. The aligned radials form legs which thereby define windows on the cage. The half-cage members are then rotated relative to each other with the angle on each radial acting as a ramp that causes the window width to lengthen or shorten in response to rotation in a particular direction. In this way, the window width may be precisely set to specification. When the window width is set, the radials are welded together forming a constant velocity joint cage needing only heat treating, and minimal polishing and grinding. No further processing of the windows is necessary.

4 Claims, 2 Drawing Sheets

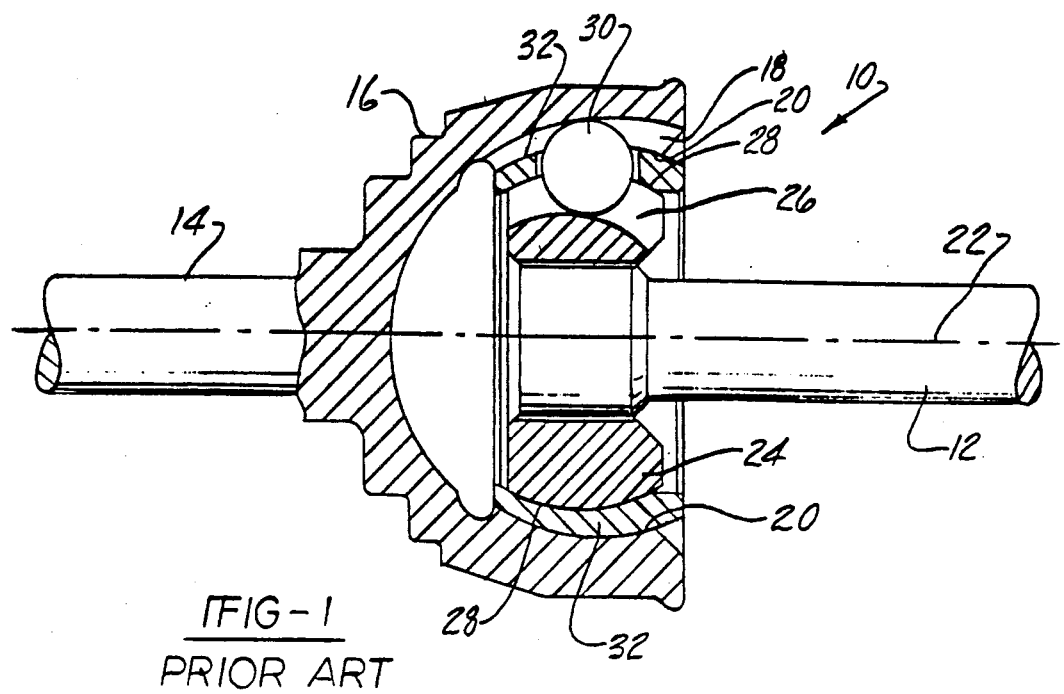
FIG-1
PRIOR ART
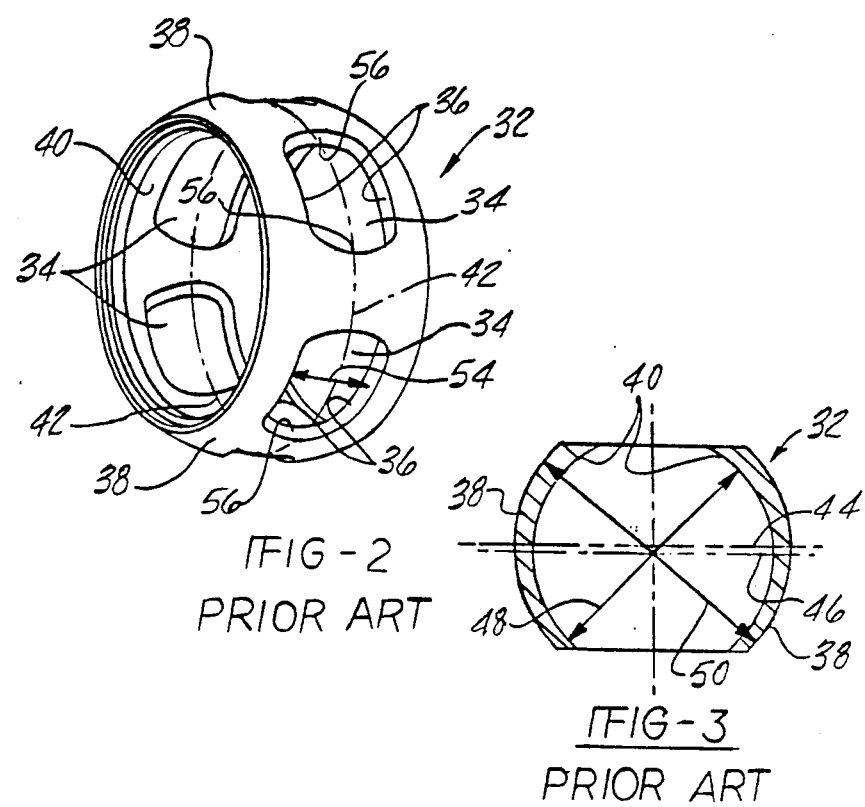
FIG-2
PRIOR ART
FIG-3
PRIOR ART

CONSTANT VELOCITY JOINT CAGE AND METHOD FOR MAKING SAME

BACKGROUND OF THE INVENTION

1. Field of the Invention

This invention relates to constant velocity universal joints and, more particularly, to a method for making the cage member used therein.

2. Description of the Prior Art

The present invention is a cage for guiding balls used in constant velocity universal joints. The construction and operation of constant velocity joints, and the use of such cages, can be understood as follows.

It is well known in the art that torque may be transmitted between two shafts which articulate relative to each other through use of a constant velocity joint. Such joints transmit torque through balls which are arranged between an inner and an outer joint member, each having guide grooves for the balls. In order to obtain constant velocity in every angular position of the joint during articulation, the balls must be guided in such a way that at each bending angle of the joints, the balls are arranged in a so called constant velocity plane, that is, a plane which passes through the instantaneous center of the joint and bisects the instantaneous input and output axes of the joint. Such axes are the rotational axes of the two joint members and the joint center is the point at which these axes intersect.

For keeping the balls always in the same plane, it is a known practice to keep the balls not only in guide grooves, but also in windows of a cage member which is arranged between the two joint members. For positively guiding the balls in a constant velocity plane during articulation of the joint, the cage member is guided within the outer joint member by a spherical surface on the outer surface of the cage and is guided with respect to the inner joint member by a spherical surface on the inner surface of the cage. A known form of constant velocity joint of this type is described in U.S. Pat. No. 2,046,584 to Rzeppa.

A typical constant velocity joint is shown in FIG. 1, where the joint 10 is structured to transmit torque between two mutually articulating shafts 12 and 14. This is accomplished by use of an annular outer member 16 having grooves 18 on its inner surface 20 parallel with the axis 22 of the joint. An inner joint member 24 is positioned within the outer joint member and is provided with grooves 26 on its outer surface 28 to form pairs of opposed grooves with the grooves on the outer joint member. A ball 30 is positioned in every pair of opposed grooves and a ball restraining member or cage 32 disposed between the two joint members retains the balls in a plane perpendicular to the axis of the cage when the joints are in the neutral position. The cage, as can be seen by reference to FIG. 2, it constructed in one piece of annular spherical shape, having spaced apart windows 34 in which the balls are guided. Guidance for the balls, in order to assure constant velocity characteristics for the joint, is provided by contact between the ball and the window sides 36. The cage is guided within the outer joint member by a spherical surface 38 on the outer surface of the cage and is guided with respect to the inner joint member by a spherical surface 40 on the inner surface of the cage. The centers of the inner and outer spherical surfaces of the cage are equidistant on opposite sides of the plane passing through the centers of the balls.

As a result of the inner and outer spherical surfaces of the cage being equidistant on opposite sides of the plane passing through the center of the balls, during joint articulation through a predetermined angle, the inner joint member, in effect, pivots around the offset center of the inner surface of the cage while the outer joint member pivots around the offset center of the outer surface of the cage. As the cage is constrained within the outer joint member, the center of the outer joint member surface must lie on the joint axis. In addition, the equal offset of the centers of the inner and outer spherical surfaces of the cage ensures that the plane of the ball center articulates accurately through one half of a predetermined joint angle, thus, maintaining constant velocity characteristics. During articulation through a predetermined joint angle, the center of the inner surface of the cage moves off the joint axis, resulting in the establishment of a new ball center plane displaced slightly from the theoretical joint plane center, i.e., the center at zero joint angle, resulting in a very small axial displacement of the joint center thereby requiring some axial movement of the cage with respect to the outer joint member. Accordingly, there is no tendency to jam and the geometry is such that the cage inner and outer surface centers always remain equally offset from the instantaneous joint center which passes through the center of the balls. That is, the plane of the ball centers is always the true median plane of the joint.

FIG. 2 shows a prior art constant velocity joint cage of the type used to retian the torque transmitting balls used in constant velocity joints. As can be seen, the cage 32 is formed of one piece in the shape of an annular section of a sphere truncated approximately symmetrically about the window centerline 42. Both the spherical inner surface 40 and the spherical outer surface 38 of the cage may be positioned around offset centerlines. This is particularly shown in FIG. 3 where the spherical inner surface 40 and spherical outer surface 38 of the cage 32 have slightly offset centerlines 44 and 46, respectively; and where the inner surface diameter 48 is less than the outer surface diameter 50. The windows 34, as shown in FIG. 2, are usually six in number matching the number of grooves in each of the inner and outer joint members. The windows are positioned symmetrically about the cage and may be of various shapes and have a particular window centerline 42 as required for a particular constant velocity joint application.

The critical tolerances are the window width 54 and the relationship between the centerline of the windows and the centerlines of the inner and outer spherical surfaces. These are critical for proper functioning and operational life-time of the constant velocity joint. The width of the window is critical because window sides parallel to the window centerline 42 serve as the ball guide surfaces or sides 36 which make contact with the ball, guiding it in a direction transverse to the window centerlines, as the shafts articulate it is desirable to minimize play therebetween. The window ends 56 need only be far enough apart so as to ensure that the balls will not be interfered with, as the grooves 26 in the inner joint member 24 and the grooves 18 in the outer joint member 16 serve to guide the balls in a direction transverse to the window centerline. This is a particularly important fact for the method of making constant velocity joint cages according to the present invention, as will be seen, following.

It is apparent from the foregoing that the ball retaining cage must be manufactured to close tolerances in order to assure that the balls will always be guided, as the joint articulates, in the true median plane of the joint. Of particular sensitivity is the shape of the cage and the dimensioning of the windows.

The current practice in the art is to make the cages as follows:

A segment is cut from the length of tubing. The segment is then formed into an annular spherical shape followed by rough finishing by turning them to approximate size and shape. Thereafter, windows are punched or cut in the segment followed by heat treating and finish grinding. This process is a natural outgrowth of the shape and function of the part and the generally available methods to produce it. The method currently in use results in high processing and excess offal costs, as well as high scrap and rework rates.

The present invention is an improved method by which the ball retaining cage used in constant velocity joints may be manufactured simply, easily, and accurately, at a lower cost with a minimum of offal and scrap.

SUMMARY OF THE INVENTION

Constant velocity joints utilize a cage of guiding balls used to transmit torque between two grooved articulating joint members which are in turn connected to external shafts. The cage is constructed of an annular spherical shape and nests between spherical surfaces of the articulating joint members. A plurality of windows on the cage serve to guide the torque transmitting balls to assure that they remain always in that portion of the grooves that is at the homokinetic plane of the joint.

The present invention is a method of making these cages with great accuracy and great simplicity. A flat sheet meal stock is die-cut stamped or cut by laser into a circularly shaped multi-limbed "starfish," having a central circular aperture and truncated limb radials that end in a predetermined angle. The "starfish" shaped metal is then pressed into a annular spherical shape, forming a half-cage member. This process is repeated to make a second half-cage member. The two half-cage members are then placed together with their radials aligned. The aligned radials thereby form legs which define a plurality of windows. The half-cage members are then rotated relative to each other with the angle on each radial acting as a ramp that causes the legs to length or shorten in resposne to rotation in a particular direction. In this way the window width may be precisely set to specification. When the window width is set, the radials are welded together forming a constant velocity joint cage needing only heat treating and grinding. No further processing of the windows is required since they are already at finished size.

Accordingly, it is an object of the present invention to provide a method for making constant velocity joint cages which minimizes offal, scrap, rework, production time, and costs of manufacturing, while suffering no loss of function when used in a constant velocity joint.

It is a further object of the present invention to provide a method of making constant velocity joint cages which assures that dimensions are kept to very close tolerance with a minimum of finishing work.

It is still an additional object of the present invention to provide a method for making constant velocity joint cages in which there is no need to punch or cut out the windows in an annularly shaped segment.

It is still a further object of the present invention to provide a method for making constant velocity joint cages from flat sheet metal stock.

It is an additional object of the present invention to provide a method for making constant velocity joint cages where the width of the windows may be precisely set by merely rotating two half-cage members relative to one another.

BRIEF DESCRIPTION OF THE DRAWINGS

FIG. 1 is a cross-sectional side view of a constant velocity joint used in the prior art;

FIG. 2 is a perspective view of a constant velocity joint cage used in the prior art;

FIG. 3 is a cross-sectional view of a prior art constant velocity joint cage;

DETAILED DESCRIPTION OF THE PREFERRED EMBODIMENT

Figure 4:
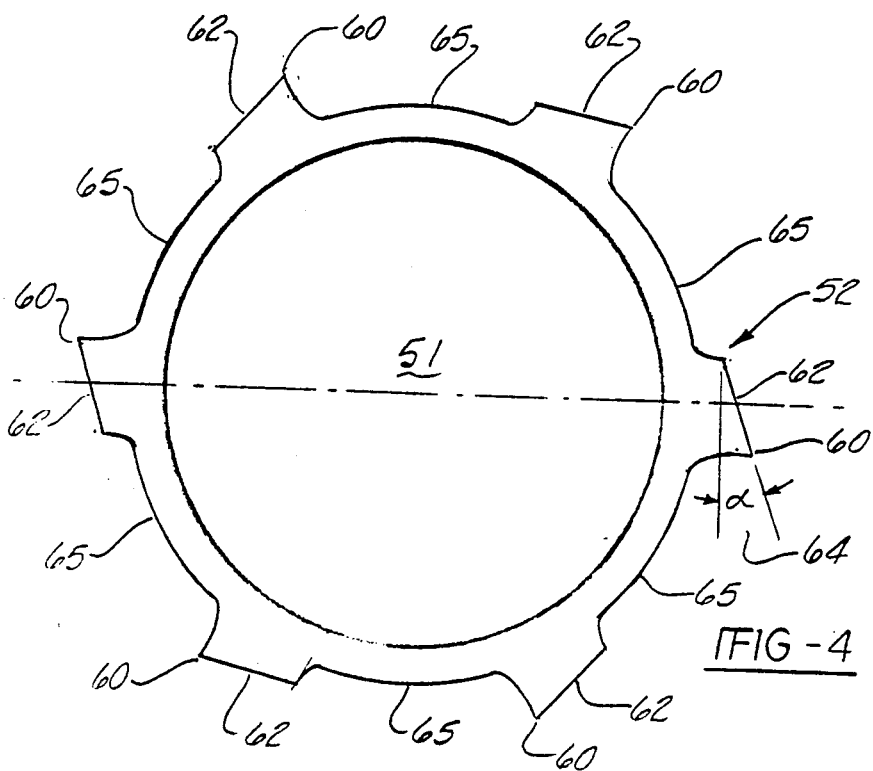
FIG. 4 is a plan view of a circularly shaped piece of flat sheet metal stock which has been die-cut according to the teaching of the invention.
Figure 5:
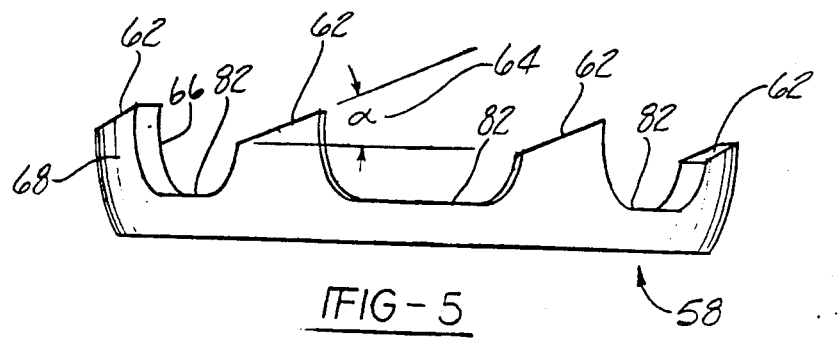
FIG. 5 is a side view of half-cage member after pressing into an annular spherical shape.

According to the method of the present invention, FIG. 4 shows a section of sheet metal stock that has been cut into a circularly shaped multi-limbed member 52. The sheet metal stock can be cut by any method known in the art, die-cut stamping and/or punching and laser being preferred. As can be seen from the figure, the multi-limb member 52 is cut so as to have a central circular aperture 51 therein and a plurality, usually six in number, of generally truncated limb radials 60 extending therefrom which end 62 in a specific predetermined angle 64 which will be later elaborated upon. The circular segments 65 between the truncated limb radials 60 will become ball guide surfaces 82 as will be elaborated below. This process is repeated twice for each cage to be produced, as each finished constant velocity cage is composed of two identical multi-limb members 52. In the preferred method, a plurality of multi-limb members 52 are nested relative to each other so as to minimize offal during die-cutting. Each multi-limb member 52 is then pressed or stamped into an annular spherical shape forming a half-cage member 58, as shown in FIG. 5, so that an inner spherical surface 66 and an outer spherical surface 68 is formed of the proper curvature and centerline that is required for the constant velocity joint application that is intended. It will be seen from FIG. 5 that pressing the multilimb member 52 into an annular spherical shape has resulted in the circular segments 65 becoming ball guide surfaces 82. In the preferred method, the die-cutting and shape pressing processes would all be formed in the same progressive press to ensure economy and precision. The half-cage members are then finished or coined to correct tolerance, flatness and angle.

Figure 6:
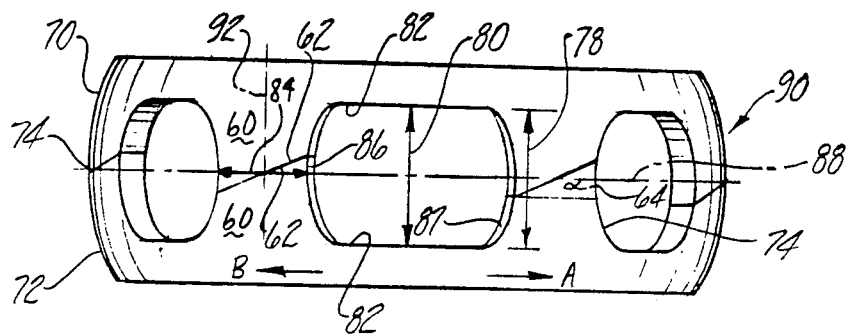
FIG. 6 is a side view of a constant velocity joint cage which has been formed by placing two half-cages together with the radials aligned.

Two half-cage members, a first 70 and a second 72, are then placed together in a relative orientation in which the limb radials 60 are aligned. The aligned limb radials make contact at the angled ends 62, forming legs 74. Between each pair of lets is an opening that form a window 76. This is shown in FIG. 6. It will be seen from FIG. 6 that the end of the limb radials 62 line up along the predetermined angle 64 which was referred to above. This angle is intended to serve as a ramp along which the angled ends of the radials can slide in relation to each other as the two half-cage members are rotated relative to each other; a greater or lesser window width 80 thereby being achieved. The proper window width is determined according to the particular constant velocity joint application and is easily attained by rotation of the two half-cages relative to each other until the width between the ball guide surfaces 82 of the window meets the specified limitations. For example, a rotation of the second half-cage member 72 along arrow A in relation to the first cage member 70 will cause the leg length 78 to decrease, thereby decreasing the window width 80; a rotation of the second half-cage member 72 along arrow B in relation to the first cage member 70 will cause the leg length 78 to increase, thereby increasing the window width 80.

As noted above, the leg length 78 will change as each half-cage member is rotated relative to the other. Also, the leg width 84 will change as well. Such change in width must not be so large as to cause the window ends formed by the edges 86 and 87 of the legs 74 to interfere with the balls during operation of the constant velocity joint. This is accomplished by choosing an angle 64 for the ends 62 of the limb radials 60 which will achieve correct window width in response to relative rotation of the first and second half-cage members before leg width becomes large enough to cause ball interference in relation to the grooves during constant velocity joint operation. High values of angel 64 will require less relative rotation of the first and second half-cage members to attain a certain change in leg length than small values of angle 64 would require. While high values of angle are preferred from this standpoint, it must be kept in mind that fine tuned variations in leg length are most easily accomplished with lower values of angle. Thus, the predetermined angle that is selected must take into account these factors.

The edges 86 and 87 of the lens 74 will be seen from FIG. 6 to form an end to each window when the first and second half-cage members are aligned. In the preferred embodiment, edges 86 and 87 are cut such that when the first and second half-cage members are aligned a concave shaped end of each window is thereby formed. This shape aids in ensuring non-interference by the edges 86 and 87 with the balls.

When the desired window width has been achieved by relative rotation of the first and second half-cage members, the two half-cage members are then welded along the ends 62 of the limb radials. Laser welding or EB welding with the appropriate pressure between the first and second half-cage members are preferred as the melt is predictable, which is important in terms of control of distortion and strength, and heat is relatively low.

The two half-cage members 70 and 72, which are now welded together, form a cage 90 which is ready for heat treating and OD and ID grinding and polishing. Because the window dimensions ar set by the relative rotary adjustment of the two half-cage members 70 and 72 at the time of welding and the precise width of the windows has already been achieved, there is no need to further process the windows of the cage.

It is, therefore, understood that the cage 90 made according to the method of the present invention as shown in FIG. 6 is functionally the same as the cage 32 shown in FIG. 2.

In making the half-cage member according to the method of the present invention the following is important. A flat sheet metal stock is selected of a particular thickness such that, after it has been cut, pressed, and then aligned together with its identical counterpart half-cage member, the desired inner and outer surface diameters corresponding to 48 and 50 in the cage 32 shown in FIG. 2 will result. Each of the limb radials are cut to a length corresponding to substantially one-half the desired window width, as measured along their radial center 92. Each of the radials are cut to a width 84 substantially equal to the desired distance between the windows along the window centerline 88 while, in addition, assuring no ball interference by the radial edges 86 and 87 will occur when the first and second half-cage members are relatively rotated to achieve the correct window width 80. The angle selected for the radial ends is such as to allow for accurate setting of the window width 80, which at the same time assures that no resulting ball interference by the radial edges 86 and 87 will occur in operation of the constant velocity joint. The center circular aperture 51 has a diameter selected to result, when the first and second half-cage members are aligned, in the truncated spherical shape of a constant velocity cage, as shown generally in FIG. 2.

To those skilled in the art to which this invention appertains, the above described preferred embodiment may be subject to change or modification. Such changes or modifications can be carried out without departing from the scope of the invention, which is intended to be limited only by the scope of the appended claims.

What is claimed is:

1. A constant velocity universal joint cage comprising:
   two substantially similarly shaped half-cage members, each half-cage member having one end;
   a planar opposite end;
   an annular spherically shaped shell element extending from said one end toward said planar opposite end, said annular spherically shaped shell element having at said one end a plurality of circumferentially spaced truncated limb portions at a predetermined spacing, said plurality of circumferentially spaced truncated limb portions defining therebetween a plurality of planar ball guide surfaces, said plurality of truncated limb portions each terminating in an acutely angled end edge surface;
   said half-cage members being arranged to form a cage member by abutting said plurality of circumferentially spaced truncated limb portions of one of said two substantially similarly shaped half-cage members against said plurality of circumferentially spaced truncated limb portions of the other of said two substantially similarly shaped half-cage members such that said acutely angled end edge surfaces of said two substantially similarly shaped half-cage members abut each other in an opposing slidable relationship to define selectively adjustable axial spacing between said plurality of planar ball guide surfaces of said respective half-cage members for receiving a ball therein; and
   means for securing said half-cage members in said defined spacing.

2. The constant velocity universal joint cage as defined in claim 1 wherein each said acutely angled end edge surface of said plurality of truncated limb portions comprises a cam surface such that when said two substantially similarly shaped half-cage members are placed together in said opposing slidable relationship said one of said two substantially similarly shaped half-cage members is rotated with respect to the other of said two substantially similarly shaped half-cage members such that selectively adjustable axial spacing defined by said plurality of planar ball guide surfaces of said respective two half-cage members is variable.

3. The constant velocity universal joint as defined in claim 2 wherein each said acutely angled edge surface of said plurality of truncated limb portions is an angle of approximately 20°.

4. The constant velocity universal joint as defined in claim 1 wherein each said acutely angled edge surface of said plurality of truncated limb portions is an angle of approximately 20°.

* * * * *

UNITED STATES PATENT AND TRADEMARK OFFICE
CERTIFICATE OF CORRECTION

PATENT NO.  : 4,846,764

DATED       : July 11, 1989

INVENTOR(S) : Hazebrook et al

It is certified that error appears in the above-identified patent and that said Letters Patent is hereby corrected as shown below:

Column 1, line 24, delete "joints," and insert ---- joint ----.

Column 1, line 58, delete "it" and insert ---- is ----.

Column 2, line 32, delete "retian" and insert ---- retain ----.

Column 3, line 26, delete "of" and insert ---- for ----.

Column 3, line 37, delete "meal" and insert ---- metal ----.

Column 3, line 41, delete "a" and insert ---- an ----.

Column 3, line 49, delete "resposne" and insert ---- response ----.

Column 4, line 20, after "of" insert ---- a ----.

Column 4, line 53, delete "multilimb" and insert ---- multi-limb ----.

UNITED STATES PATENT AND TRADEMARK OFFICE
CERTIFICATE OF CORRECTION

PATENT NO.   : 4,846,764

DATED        : July 11, 1989

INVENTOR(S) : Hazebrook et al

It is certified that error appears in the above-identified patent and that said Letters Patent is hereby corrected as shown below:

Column 4, line 65, delete "lets" and insert ---- legs ----, same line, delete "form" and insert ---- forms ----.

Column 5, line 30, delete "angel" and insert ---- "angle".

Column 5, line 39, delete "lens" and insert ---- legs ----.

Column 5, line 60, delete "ar" and insert ---- are ----.

Figure 6 should appear as shown on the attached sheet.

Signed and Sealed this

Thirtieth Day of April, 1991

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,846,764

DATED : July 11, 1989

INVENTOR(S) : Hazebrook et al

It is certified that error appears in the above-identified patent and that said Letters Patent is hereby corrected as shown below:

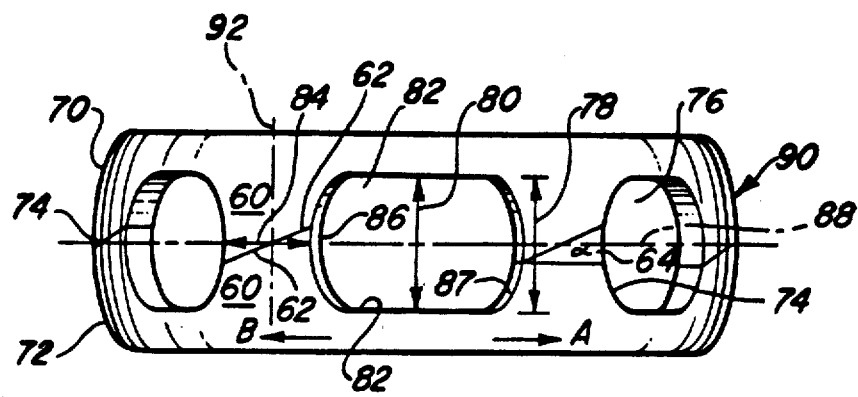

*Fig-6*